Patented June 30, 1925.

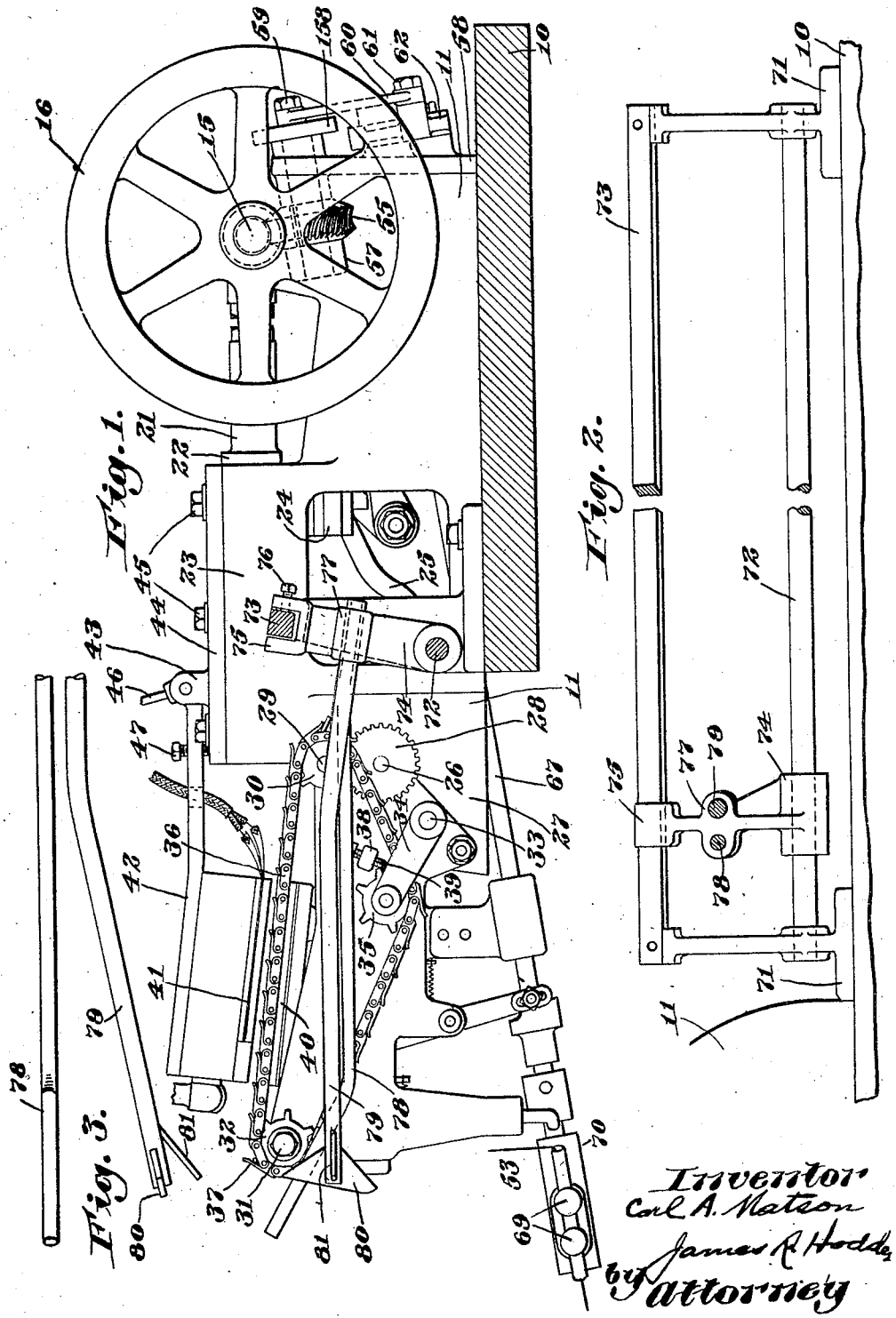

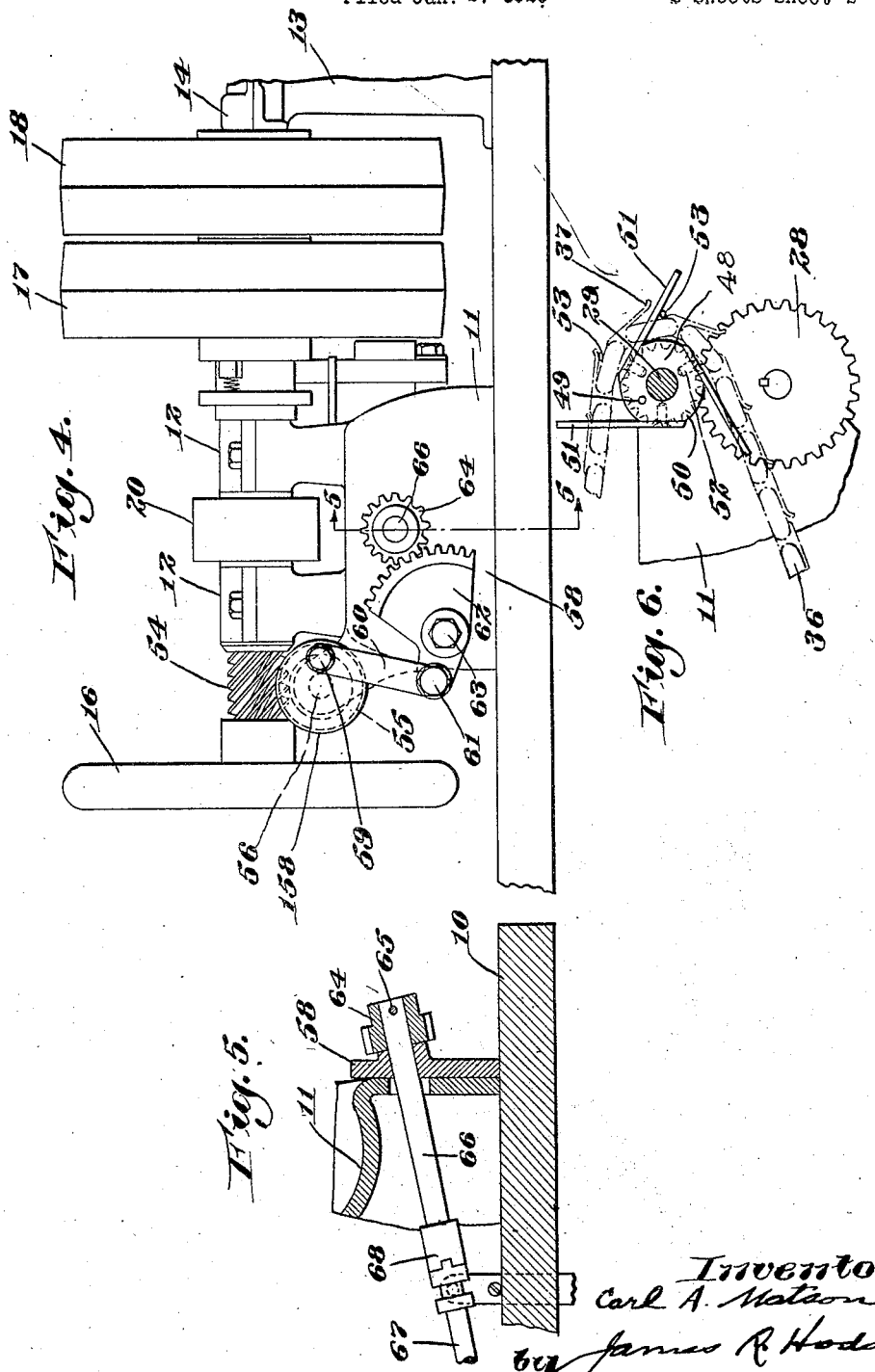

1,544,165

UNITED STATES PATENT OFFICE.

CARL A. MATSON, OF LYNNFIELD, MASSACHUSETTS, ASSIGNOR TO MATSON LACE TIPPING MACHINE COMPANY, OF BOSTON, MASSACHUSETTS, A CORPORATION OF MASSACHUSETTS.

LACE-TIPPING MACHINE.

Application filed January 2, 1923. Serial No. 610,142.

*To all whom it may concern:*

Be it known that I, CARL A. MATSON, a citizen of the United States, and a resident of Lynnfield, in the county of Essex and State of Massachusetts, have invented an Improvement in Lace-Tipping Machines, of which the following description, in connection with the accompanying drawings, is a specification, like letters on the drawings representing like parts.

My present invention relates to lace tipping machines, and more particularly to an automatically operating lace tipping machine for applying a molded or moldable composition material to form a fabric tip.

In my co-pending application for lace tipping machines, Serial No. 592,814, filed Oct. 6, 1922, I have described and claimed a lace tipping machine which will automatically feed an endless lacing to the machine where the fabric tip comprised of molded or moldable material is secured to the ends of the separate lacings, the endless lacing being cut into lacings of any desired length, and in this machine I have particularly described and claimed a means for continuously feeding an endless lacing to the machine and I have, in connection with this feeding means, described and claimed a structure for adjusting the length of the lacing to be cut from such endless lacing. In this, my present, machine, I have devised an improved form of lacing feeding machine, and one of the principal objects of my present invention is, therefore, an improved lacing feeding means adapted to feed continuously an endless lacing to a lace tipping machine where it is to be subdivided into a plurality of lacings of predetermined length.

In connection with the lace tipping machine described and claimed in the application above referred to, I have described and claimed means for predetermining the length of the various lacings to be cut from the lacing of indeterminate length, such means cooperating with the means for feeding continuously the lace of indeterminate length to the machine. In my present invention I have devised an improved means for predetermining the length of the lacings into which the lacing of indeterminate length is to be divided and such means cooperates with the improved lace feeding means above referred to. Another object of my invention, therefore, is an improved adjustable means for predetermining the length of lacing to be cut from the lacing of indeterminate length.

In the improved lace tipping machine forming the subject matter of my application above referred to, the machine has the lacing of indeterminate length fed continuously in a plurality of successive loops and I have described and claimed improved means for grasping each loop at a pair of points spaced apart from each other, and between which points the molded or moldable material is applied to the lacing, the lacing of indeterminate length being severed at the point where the tipping material is applied to cut the lacing of indeterminate length into separate lacings of predetermined length. As the lacing is fed through the machine, such gripping points release the lacing and means are employed to forcibly remove the lacing from the gripping points. Under certain conditions which may arise, such means for removing the lacing from the gripping means will fail to operate, and to remove this objection I have, in my present invention, devised an improved means for forcibly feeding the lacing out of engagement with the gripping means, such feeding means moving at a greater speed than the gripping means. A further object of my present invention, therefore, is an improved means for removing the lacing from the feeding and gripping means.

In the accompanying drawings illustrating the preferred embodiment of my invention, only so much of the machine being shown as is necessary to illustrate the application of my invention to a lace tipping machine, Fig. 1 is a side elevation;

Fig. 2 is a front elevation of the adjustable measuring means for predetermining the length of lacing to be cut from the lacing of indeterminate length; certain portions thereof being shown in section;

Fig. 3 is a plan view showing the location of the holding and length adjusting arms;

Fig. 4 is an end elevation of the lace tipping machine showing the means for driving the lace feeding means;

Fig. 5 is a sectional side elevation of a fragment of the machine taken on the line 5—5 of Fig. 4, and Fig. 6 is a fragmentary sectional elevation showing the positive means for removing the lacing from the gripping means.

Referring to the drawings, 10 designates a base suitable for mounting on a bench or pedestal that may be desired, and secured to such base in any suitable manner is a hollow frame 11 having formed integral therewith, and at one end thereof, bearings 12. Secured to the base 10 at one side thereof is a bearing standard 13 provided with a bearing 14 in alinement with the bearings 12 and in the bearings 12 and 14 is rotatably mounted a shaft 15 having secured at the end remote from the bearing 14 a hand or fly wheel 16, while mounted on the shaft 15 between one of the bearings 12 and the bearing 14 are tight and loose pulleys 17 and 18 respectively. Secured to the shaft 15, and between the bearings 12 is an eccentric (not shown) about which is fitted an eccentric strap 20, this eccentric strap 20 being connected in any suitable manner to one end of a connecting rod 21, the other end of this connecting rod being attached to a member 22 sliding in suitable bearings in a housing 23 formed integral with, and at one end of, the hollow frame 11. The sliding member 22 has formed integral therewith a downwardly extending portion 24 which, in its sliding movement, imparts a reciprocating motion to the connecting rod 25 which, through connections (not shown), imparts an intermittent rotary movement to a shaft 26 that is rotatably mounted in bearings formed in the extension 27 attached to, or formed integral with, the housing 23. Suitable means is secured on the shaft 26 for driving the shaft 29 which is rotatably mounted in the extension 27 and on either end of said shaft 29 is secured a sprocket 30. The particular construction of the mechanism for imparting the intermittent rotary movement to the shaft 26 forms no part of the present invention and it has, therefore, not been fully shown and will not be further described. Such mechanism has been fully shown and described in my application above referred to and reference is hereby made to said application for a full disclosure of this mechanism.

At the end of the extension 27 is the shaft 31 on each end of which is rotatably mounted a sprocket 32, while in the extension 27 is rotatably mounted a shaft 33 to the ends of which, and exterior of the extension 27, is secured an arm 34, each arm having rotatably mounted on its outer, or free, end an idler sprocket 35. Over the sprockets 30, 32, and 35 on each side of the extension 27 runs a feed chain 36, each link of which is provided with a gripping finger 37. Extending outwardly from each side of the extension 27 is a boss 38 through which threads an adjusting bolt 39 and by means of which tension on the feed chain 36 is adjusted. The sprockets 30 and 32 are so arranged as to guide the feed chains 36 in a relatively straight or flat reach leading from the outer end of the extension 27 inwardly to the right, as viewed in Fig. 1, toward the shaft 15.

In order to simplify the showing of the present invention, only one side, that in Fig. 1, of the machine has been illustrated, but it is to be understood that the mechanism above described with reference to the sprockets and feed chains is duplicated on the other side of the machine and such construction has been fully illustrated in my co-pending application referred to.

Beneath the straight upper reaches of the feed chains 36, and lying between the same, is a heating element 40, preferably an electrical heating element, while arranged above such straight reaches of the feed chain and between the same is a heating element 41 which is secured to an arm 42 that is pivotally mounted in bearings 43 formed integral with a plate 44 that is secured to the upper face of the housing 23 by bolts 45, a handle 46 being provided for raising such heating element 41 upwardly out of its normal position. Passing through the arm 42 is an adjusting screw 47 which engages with the upper surface of the plate 44 for adjusting the position of the heating element 41 relative to the plane passing through the upper reaches of the feed chains 36.

Secured to each end of the shaft 26 exterior of the extension 27 is a gear wheel 28 each of which meshes with, and drives, a gear wheel 48 rotatably mounted on each end of the shaft 29, these gears 29 being also mounted exterior of the extension 27. To each of the gears 48 is secured by pin 49 a circular plate or hub 50 to the periphery of each of which are secured a plurality of tangentially arranged arms 51, these arms being secured to the circular plate or hub 50 by screws 52, the arms 51 rotating on the shaft 29 is a vertical plane adjacent to the vertical plane in which lies the feed chains 36. The diameters of the gear wheels 28 and 48 are so proportioned relatively to the driving means for the sprockets 30 that the surface speed of the circular plates or hubs 50 is approximately twice the surface speed of the feed chains 36, and it will be obvious, therefore, from an inspection of Fig. 6, that an arm 51, in its relatively faster movement than the feed chain 36, will engage with the lacing 53 held between the gripping finger 37 and a block of the chain 36 and will force the same outwardly from between such gripping finger 37 and the block of the feed chain 36.

Mounted on, or formed integral with, the shaft 15 between one of the bearings 12 and the hand or fly wheel 16 is a spiral gear or worm 54 which meshes with, and drives, a spiral gear or worm wheel 55 that is secured to a shaft 56 rotatably mounted in a bearing 57 secured to, or formed integral with, a bearing plate 58 attached in any convenient manner to the end of the hollow frame 11. Secured to one end of the shaft 56 is a circular plate 158 which has extending outwardly therefrom a crank pin 59 on which is rotatably mounted one end of the connecting rod 60, the other end of this rod being attached at 61 to a segmental gear 62 that is rotatably mounted on a shaft 63 secured to the plate 58 and this segmental gear 62 meshes with, and drives, a spur gear 64 secured by pin 65 to one end of the shaft 66 rotatably mounted in the plate 58. The other end of this shaft 66 is detachably connected to a shaft 67 by a clutch member 68 and this shaft 67 extends downwardly at an angle to the horizontal to a point substantially beneath the shaft 31. Rotation of the shaft 15 causes a rotation of the shaft 56, and by means of the connecting rod 60 an oscillatory movement is imparted to the segmental gear 62 and therefore by means of the spur gear 64 and shaft 66, to the shaft 67. Secured to the end of the shaft 67 remote from the shaft 66 and extending laterally outward therefrom are parallel rods or tubes 69 provided at their outer ends with a tube 70 which extends laterally through the tubes or rods 69 and parallel to the shaft 67. The shaft 67 is oscillated in the manner above described and imparts an oscillating movement to the rods or tubes 69 and the tube 70 through substantially 180°, the segmental gear 62 being so arranged with respect to the spur gear 64 and to the shaft 56 that the oscillating movement of the rods or tubes 69 and the tube 70 is in the upper part of the circle in which its movement takes place.

Secured to the base or support 10 on each side of the hollow frame 11 are standards 71 secured together and spaced apart by means of a rod 72, and secured to the upper ends of these standards or uprights 71 is a rectangular bar 73. Slidably mounted on the rod 72 is a member 74 the upper end of which is forked at 75 and which embraces the rectangular rod 73, a set screw 76 being employed to hold the member 74 in any desired position with respect to the rod 72. The member 74 intermediate its ends is provided with an enlargement 77 in which is secured a rod 78 which extends in a direction away from the shaft 15, its free end being curved upwardly to a point adjacent the shaft 31 and also with a storage rod 79 which extends substantially horizontal and is provided on its outer end with a cam plate 80 that is arranged in a vertical plane and with a rod 81 which extends outwardly at an angle to the main portion of the rod 79, as clearly shown in Fig. 3. It is understood, of course, that there are a pair of standards or uprights 71 with the mechanism above described on each side of the hollow frame 11 and that, therefore, there is a rod 78 and a storage rod 79 on each side of the extension 27. The rod 79 is called a storage rod because of the fact that loops of lacing are stored thereon prior to the feeding of such loops through the machine.

The rods 78 and 79 and cam member 80, as well as the outwardly extending rod 81, cooperate with the gripping fingers 37 on the feed chains 36 and with the rods or tubes 69 and tube 70 on the shaft 67 to feed loops of lacing from the lacing of indeterminate length into the machine. The manner in which this feeding operation is performed is as follows: It is assumed that the end of the lacing 53 of indeterminate length which is located on a reel or other suitable device adjacent to the machine is threaded through the tubing 70 and fastened to any convenient portion of the machine. The shaft 15 is rotated in the usual manner, as by a belt over the tight pulley 17 which, through the medium of the depending portion 24 of the sliding member 22 and the connecting member 25, imparts an intermittent step by step movement to the feed chains 36 which feed chains, as they pass over the sprockets 32, separate the fingers 37 from the associated blocks. Also, the shaft 15, through the gears 54, 55, segmental gears 62, and pinion 64 impart an oscillating movement to the shaft 67 and, therefore, to the rods or tubes 69 and tube 70. As the tubes or rods 69 and the tube 70 swing in an arc about the shaft 67 as a center from the position shown in Fig. 1, the lacing is brought over the top of, and lies on, the rods 78, and owing to the upward curve of the ends of such rods 78, such lacing tends to slide downwardly into engagement with the feed chains 36. During this movement of the tube 70 that carries the lacing 53, such lacing engages the practically vertical edge of the cam member 80, and when the tube 70 reaches the extreme limit of its travel and starts on its return movement, a slack loop is formed in the lacing 53 and this loop slides down on the vertical face of the cam 80 and catches at the lower pointed end thereof and, as the lacing 53 is paid out by the tube 70 on the return movement, such payed out portion is drawn over the free ends of the rods 78, the loop formed in the end being guided by the rear bevel portion of the cam 80 and by the outwardly extending rod 81 backwardly onto the storage rod 79. The feed chains 36 in their intermittent step by step movement over the sprockets 32 separate the gripping fingers 37 from the associated block and the hook device formed by the gripping fingers and associated blocks successively take up the lengths of lacing 53. As the feed chains 36 move forward into the straight reach between the sprocket 32 and 30, the gripping fingers 37 automatically move into position against their associated blocks, gripping the lengths of lacing and holding them in position during the travel of the feed chains. The lengths of lacing are fed between the heating elements 40, and 41, it being understood, of course, that molded or moldable material is applied to a portion of such short length of lacing prior to coming within the influence of such heating elements. As, however, the operation of applying the molded or moldable material and the subsequent operations on such molded or moldable material form no part of the present invention, such mechanism has not been shown and will not be further described or referred to. Such mechanism and the manner of its operation is shown and described in my copending application above referred to and reference is hereby made to such application for a full disclosure thereof. As the lengths of lacing are fed into the machine and toward the main shaft 15, they are severed after the operation of applying the molded or moldable material and such lengths remain on the rods 79 from which they may be periodically removed.

After the molded or moldable material has been firmly placed on the lacing 53 that lies between the feed chains 36 and the lacing severed at such point, the feed chains 36 pass over the sprockets 30 where, as shown in Fig. 6, the gripping fingers 37 move outwardly from their associated blocks with a view to allowing the lacing 53 to drop off the feed chains. Such dropping off of the lacing 53 is insured by the arms 51 on the circular plate or hub 50 which, as stated above, has a greater surface speed than the speed of the feed chain 36. In order to adjust, or predetermine, the length of short lacings to be made from the lacing 53 of indeterminate length, the sliding member 74, carrying the rods 78 and 79, may be moved toward or from the feed chains 36 along the rod 72 and the set screw 76 is employed to hold such member 74 and the rods 78 and 79 in adjusted position.

While I have necessarily shown and described the preferred embodiment of my invention somewhat in detail, it is to be understood that I may vary the details of the construction and arrangement of parts comprising my improved machine within wide limits without departing from the spirit of the invention.

Having thus described my invention, what I claim as new is:

1. In a lace tipping machine, the combination of a feed chain, gripping means thereon, means for feeding a lacing of indeterminate length into position to be grasped by the gripping means on the feed chain, and means for imparting an oscillatory movement to said lacing feeding means.

2. In an improved lace tipping machine, the combination of a feed chain, means having an oscillatory movement for feeding a lacing of indeterminate length to said feed chains, a guide rod associated with said feed chains for guiding said lacing into association with said feed chains, a storage rod, and a cam mounted on the end of said storage rod for guiding loops of lacing into storage position.

3. In an improved lace tipping machine, the combination with a lace feeding means, and means for imparting an oscillatory movement thereto, of a frame, a feed chain mounted thereon, and adjustable length determining means associated with said feed chains for predetermining the length of lacing loops fed to the feed chains.

4. In an improved lace tipping machine, the combination of a feed chain, means having an oscillatory movement associated therewith, and for feeding loops of lacing to said feed chains, and adjustable length determining means associated with the feed chains for predetermining the length of lacing loops to be fed to the feed chains.

5. In an improved lace tipping machine, the combination of a frame, a feed chain mounted thereon, a main drive shaft, means for feeding loops of lacing to the feed chain, and means interposed between the drive shaft and the last named means for imparting an oscillatory movement to said means.

6. In an improved lace tipping machine, the combination of a frame, a feed chain mounted thereon, a main drive shaft, driving means between the drive shaft and feed chain for imparting an intermediate step by step motion to said feed chain, a second shaft, an arm attached thereto, and driving connections interposed between said shaft and the main shaft for imparting an oscillatory movement to said arm in synchronism with the intermittent step by step movement of the feed chains.

In testimony whereof, I have signed my name to this specification.

CARL A. MATSON.